(12) United States Patent
Stafford et al.

(10) Patent No.: US 8,868,788 B2
(45) Date of Patent: Oct. 21, 2014

(54) OPTIMIZING STATIC DICTIONARY USAGE FOR SIGNAL COMPRESSION AND FOR HYPERTEXT TRANSFER PROTOCOL COMPRESSION IN A WIRELESS NETWORK

(75) Inventors: Matthew Stafford, Austin, TX (US);
Kennie Y. Kwong, Atlanta, GA (US);
Mark S. Wuthnow, Austin, TX (US);
William Rosenberg, Austin, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 40 days.

(21) Appl. No.: 13/079,152

(22) Filed: Apr. 4, 2011

(65) Prior Publication Data
US 2011/0176491 A1 Jul. 21, 2011

Related U.S. Application Data

(62) Division of application No. 11/559,310, filed on Nov. 13, 2006, now abandoned.

(51) Int. Cl.
*H04W 4/00* (2009.01)
*H04L 29/06* (2006.01)

(52) U.S. Cl.
CPC ............ *H04L 69/04* (2013.01); *H04L 65/1006* (2013.01)
USPC ........... 709/247; 380/217; 382/232; 370/328; 370/477

(58) Field of Classification Search
USPC .......................................................... 713/1
See application file for complete search history.

(56) References Cited

U.S. PATENT DOCUMENTS

| | | | |
|---|---|---|---|
| 5,991,713 A | 11/1999 | Unger et al. | |
| 6,078,951 A | 6/2000 | Pashupathy et al. | |
| 6,163,780 A | 12/2000 | Ross | |
| 6,263,437 B1 * | 7/2001 | Liao et al. | 713/169 |
| 6,934,756 B2 * | 8/2005 | Maes | 709/227 |
| 6,963,587 B2 * | 11/2005 | Hannu et al. | 370/477 |
| 6,968,185 B2 | 11/2005 | Chitrapu et al. | |
| 7,010,727 B1 * | 3/2006 | Stucker | 714/52 |
| 7,024,187 B2 | 4/2006 | Moles et al. | |
| 7,096,311 B2 * | 8/2006 | Chiang | 711/100 |
| 7,102,552 B1 | 9/2006 | Archbold et al. | |
| 7,143,191 B2 | 11/2006 | Chuah et al. | |
| 7,213,143 B1 | 5/2007 | Watson et al. | |
| 7,348,904 B2 | 3/2008 | Christoffersson et al. | |

(Continued)

FOREIGN PATENT DOCUMENTS

| | | |
|---|---|---|
| WO | 2002073810 A1 | 9/2002 |
| WO | 2005011298 A2 | 2/2005 |

OTHER PUBLICATIONS

Camarillo, G., "RFC3486 Compressing the Session Initiation Protocol (SIP)," Network Working Group, Ericsson, Feb. 2003, 9 pages.

(Continued)

*Primary Examiner* — Andrew Goldberg
(74) *Attorney, Agent, or Firm* — Abel Law Group, LLP (57) ABSTRACT

A method includes receiving a registration request including a first dictionary definition. The registration request is associated with user equipment. The method includes transmitting to the user equipment a response including a second dictionary definition. The method includes transmitting subsequent messages to the user equipment if the first and second dictionary definitions agree, the subsequent messages being compressed using the first static dictionary.

7 Claims, 5 Drawing Sheets

(56) References Cited

U.S. PATENT DOCUMENTS

| | | | |
|---|---|---|---|
| 7,412,541 | B1 | 8/2008 | Stadler et al. |
| 7,554,467 | B2 | 6/2009 | Thomas |
| 7,603,479 | B2 | 10/2009 | Shand et al. |
| 2002/0059462 | A1* | 5/2002 | Hannu et al. ................. 709/247 |
| 2002/0166048 | A1* | 11/2002 | Coulier ........................ 713/169 |
| 2003/0097474 | A1 | 5/2003 | Defosse et al. |
| 2003/0120813 | A1* | 6/2003 | Majumdar et al. ............ 709/247 |
| 2003/0186681 | A1* | 10/2003 | Gabor .......................... 455/411 |
| 2003/0187646 | A1* | 10/2003 | Smyers et al. ................ 704/257 |
| 2003/0220107 | A1* | 11/2003 | Lioy et al. ................. 455/435.1 |
| 2004/0022391 | A1* | 2/2004 | O'Brien ........................ 380/281 |
| 2004/0039926 | A1 | 2/2004 | Lambert |
| 2004/0193920 | A1 | 9/2004 | Kiss et al. |
| 2005/0004972 | A1 | 1/2005 | Meskauskas |
| 2005/0009520 | A1* | 1/2005 | Herrero et al. ............. 455/435.1 |
| 2005/0050328 | A1* | 3/2005 | Mizrah ........................ 713/171 |
| 2005/0172032 | A1 | 8/2005 | Pessi |
| 2005/0234853 | A1 | 10/2005 | Barth et al. |
| 2006/0078096 | A1 | 4/2006 | Poyhonen et al. |
| 2006/0117307 | A1* | 6/2006 | Averbuch et al. ............ 717/143 |
| 2006/0262812 | A1 | 11/2006 | Liu et al. |
| 2006/0270418 | A1 | 11/2006 | Hannu et al. |
| 2007/0002855 | A1 | 1/2007 | Pessi |
| 2007/0140125 | A1* | 6/2007 | Pessi ............................ 370/236 |
| 2007/0153775 | A1 | 7/2007 | Renschler |
| 2007/0258451 | A1 | 11/2007 | Bouat |
| 2008/0037509 | A1* | 2/2008 | Foti ............................. 370/349 |
| 2008/0075062 | A1* | 3/2008 | Neil et al. .................... 370/351 |
| 2008/0115125 | A1 | 5/2008 | Stafford et al. |

OTHER PUBLICATIONS

Campbell, B. et al., "Instant Message Sessions in Simple," Simple Working Group, Cisco Systems, May 22, 2003, pp. 1-44.

Deutsch, L. Peter et al., "RFC1950 ZLIB Compressed Data Format Specification version 3.3," Network Working Group, Aladdin Enterprises, May 1996, pp. 1-11.

Deutsch, P. ,"RFC1951 Deflate Compressed Data Format Specification version 1.3," Network Working Group, Alladin Enterprises, May 1996, pp. 1-17.

Deutsch, P., "RFC1952 GZIP file format specification version 4.3," Network Working Group, Aladdin Enterprises, May 1996, pp. 1-12.

Garcia-Martin, M. et al., "RFC3485 The Session Initiation Protocol (SIP) and Session Description Protocol (SDP) Static Dictionary for Signaling Compression (SigComp)," Network Working Group, Feb. 2003, pp. 1-30.

Garcia-Martin, M., "The Presence-Specific Dictionary for the Signaling Compression (Sigcomp) Framework," Simple Working Group Internet-Draft, URL <tools.ief.org/html/draft-garcia-simple-presence-dictionary-00>- ;, Jun. 16, 2006, pp. 1-16.

Hannu, H. et al., "RFC3321 Signaling Compression (SigComp)—Extended Operations," Network Working Group, Jan. 2003, pp. 1-18.

International Preliminary Report on Patentability with Written Opinion mailed Sep. 29, 2009 in International App. No. PCT/US2007/082469, 12 pages.

Invitation to Pay Additional Fees and Partial International Search, European Patent Office, mailed Jul. 27, 2009 for PCT/US2007/082469, 6 pages.

Jennings, C. et al., "Relay Extensions for Message Sessions Relay Protocol (MSRP)," Simple Working Group, Systems, Inc., Apr. 20, 2004, pp. 1-27.

Liu, Zhigang et al., "Scalable, Robust, Efficient Dictionary-Based Compression (SCRIBE) <draft-liu-rohc-scribe-01.txt>" Nokia Research Center, IEFT Standard-Working-Draft, Internet Engineering Task Force, IETF, CH, No. 1, Jul. 18, 2001, pp. 1-86.

Non-Final Office Action mailed Jul. 10, 2009 in U.S. Appl. No. 11/559,310, 15 pages.

Non-Final Office action mailed May 13, 2010 in U.S. Appl. No. 11/559,310.

Nordberg, Mats et al.: "Improving SigComp Performance Through Extended Operations," Vehicular Technology Conference, 2003, IEEE 58th Vehicular Technology Conference, Oct. 6-9, 2003, vol. 5, pp. 3425-3428.

Price, R. et al., "RFC3320 Signaling Compression (SigComp)," Networking Working Group, Jan. 2003, pp. 1-62.

Price, Richard et al., "Universal Decompressor Virtual Machine (UDVM)," Network Working Group, Jan. 28, 2002, pp. 1-43.

Price, Richard et al., "Universal Decompressor Virtual Machine (UDVM) <draft-ietf-rohc-sigcomp-udvm-00.txt>" IETF Standard-Working-Draft, Internet Engineering Task Force, IETF, CH, vol. rohc, Jan. 28, 2002, pp. 1-43.

* cited by examiner

OPTIMIZING STATIC DICTIONARY USAGE FOR SIGNAL COMPRESSION AND FOR HYPERTEXT TRANSFER PROTOCOL COMPRESSION IN A WIRELESS NETWORK

CROSS-REFERENCE TO RELATED APPLICATION(S)

This application is a divisional of U.S. patent application Ser. No. 11/559,310, filed Nov. 13, 2006, entitled "Optimizing Static Dictionary Usage for Signal Compression and for Hypertext Transfer Protocol Compression in a Wireless Network," naming inventors Matthew Stafford, Kennie Y. Kwong, Mark S. Wuthnow, and William Rosenberg, which application is incorporated herein by reference.

TECHNICAL FIELD

The technical field relates to wireless communication networks and, in particular, to methods and apparatus for facilitating and optimizing the application of compression, for example, to data signal compression and in internet applications including JAVA virtual machine bytecode and hypertext transfer protocol (HTTP) applications in such networks.

BACKGROUND OF THE INVENTION

Generally, wireless communication networks suffer a disadvantage in comparison with wired communication networks because wireless communication networks must utilize valuable radio frequency spectrum for the transmission of signals to wireless mobile devices (including portable terminals such as computer terminals or personal communication devices). Spectrum is expensive to purchase as exemplified by the wireless communications RF spectrum sales of the 1990s. Moreover, the greater the application of uncompressed signals, power for transmitting signals in the purchased RF spectrum can be wasted along with the spectrum utilization increase. Further complicating and making the need for compression even greater in a wireless communication network, the applications for such mobile devices have greatly expanded as wireless communications have, in many instances, replaced wired communication devices because of the great, almost unbounded popularity of the devices and the features that such devices may provide. Consider, for example, currently available mobile devices providing input/output for taking and receiving digital photographs (which can be compressed in accordance with known JPEG compression techniques), receiving downloaded MPEG compressed movie streams for a subscriber's viewing pleasure, the opportunity to short text message to "buddy lists" of friends, associates and family members having mobile devices, download, store and play compressed digital music in stereo of the subscriber's choice and so on.

Also consider the differences between text compression, for example, the compression of a voice message converted to text or a text document or a text message versus JPEG or MPEG compression. The former needs to be lossless, that is, the message at the transmitter ideally should be perfectly reproduced at the receiver after compression and decompression. On the other hand, JPEG and MPEG image compression follow a different philosophy. The compression/decompression process need not be perfect and some original image data may be lost intentionally, but only such that the received image is practically identical to the transmitted image and any loss is not perceptible to the viewer.

In a virtual machine, bytecodes are known for representing the machine language of, for example, a Java virtual machine. The bytecode stream represents a sequence of instructions for the virtual machine. HTTP is a known protocol for internet address and command processing. In wireless communications involving the network, there is a need for compression of such data signals. These types of data streams are akin to text compression where there is a requirement for lossless compression/decompression processes.

Many of the new applications for mobile devices have centered around an implementation of a session initiation protocol (SIP) described, for example, by RFC 3261. SIP provides a protocol for negotiating session parameters between session endpoints, for example, such as setting up and tearing down Voice over IP sessions between VoIP phones or sessions in which a camera image is transmitted from one cell phone to another. Moreover, data signal transmission and data compression are also known from such well known compression algorithms as ZLIB (RFC 1950), DEFLATE (RFC 1951) and GZIP (RFC 1952), and other compression algorithms and techniques, all of which are well known to the Internet community at large.

More recently, progress has been made in the development of standard compression interfaces and techniques for signal compression as exemplified by the efforts described by RFC 3320 and RFC 3321. Also, recently, a session initiation protocol (SIP) and a session description protocol (SDP) static dictionary have been described in RFC 3485. Moreover, a so-called universal decompressor virtual machine (UDVM) has been described, much like a Java virtual machine, for running decompression algorithms and to provide almost unlimited flexibility for choosing how to compress/decompress a given item of data. With UDVM, both terminal ends, for example, two mobile devices exchanging photographs or a mobile device gaining access to a video-on-demand movie server must know what compression/decompression the other end is using for the data signal; otherwise, the compression/decompression provided by the UDVMs will not function at an optimum level. On the other hand, in SigComp as applied in SIP, headers as well as message bodies may be compressed. Yet, network elements need to read the SIP headers for routing and other purposes. Consequently, there is a problem with end-to-end transmission for SIP because a network element may have to decompress headers along a route to an end point. Consequently, there may be a problem with the applicability of SigComp end-to-end as would be required as applied in SIP.

Also, in accordance with the third generation partnership project, 3G PP, for the global system for mobile communications (GSM) and which can be used in related UMTS standards, an internet protocol (IP) multimedia subsystem (IMS) has been defined for multimedia applications, for example, per TS 23.228, 24.228 and related technical specifications. There is proposed, for example, a proxy call session control function (P-CSCF), an interrogating CSCF (I-CSCF) and a serving CSCF (S-CSCF). SIP messages between one's handset and its associated P-CSCF may be compressed as are SIP messages between another person's handset and its P-CSCF. But between P-CSCFs, the SIP messages are generally uncompressed because as explained above, the headers are needed for routing and there is limited motivation to apply SigComp to a portion of a message and not the whole. These control functions are known for use in home and visited networks by mobile devices for multimedia services as an outbound proxy (the first SIP-layer point of contact for a mobile device in, for example, a general packet radio service (GPRS) network). These control functions may be accessed by a mobile device that would want to engage in a real-time interactive multimedia application with a mobile device in the same or in another wireless communication network. The virtual machines such as the UDVM mentioned above are resident in, for example, the mobile device and the P-CSCF. The capabilities of both ends of a communication path should be consistent with one another to successfully restore compressed content to its original form.

Presence is becoming increasingly important to wireless network features and services. Presence relates to registration of a mobile device that is turned on and in a mode for receiving communications which may be standard voice calls or limited to receiving, for example, text messages from a "buddy." As alluded to above, one or more "buddy lists" may be input by a wireless subscriber for friends, associates and family of the subscriber and used to signal "presence" information among "buddies." The wireless subscriber will typically wish to receive updates regarding his/her buddies' presence status, as presence status is dynamic. For example, a college student may receive presence information indicating that a given buddy is currently not available for voice calls, but can receive text messages. Based on this information, the student signals that "buddy" by text message to meet him/her in the library at 10:00 AM. In so doing, eXtensible Markup Language (XML) (not visible to the user) is commonly used to represent contact information, such as an address book, each of which may be delimited with the string <contact> at the beginning of the string of contacts and </contact> at the end of the string. Inside one of the contact strings, <name> and </name> may be used to identify a name of a "buddy" or contact. Presence information, bracketed by additional delimiters, may be stored with the contact information. SIP has been identified as a suitable vehicle for publishing one's presence information and for receiving updates regarding a buddy's presence. HTTP has been identified as a suitable vehicle for managing one's buddy lists. So for presence and buddy list management, SIP and HTTP messages are launched and the message bodies may be XML documents.

Consequently, even with all these improvements in the art of providing compression techniques and virtual and other machines for providing compression/decompression in accordance with alleged unlimited flexibility, there remains an opportunity to facilitate, if not to optimize, the use of compression via application, for example, of static dictionaries and other techniques for compressing various signals, bytecode, SIP and HTTP messages, XML documents and other data signals used in a wireless communications network environment where the need for compression is the greatest.

SUMMARY OF THE INVENTION

Several embodiments will now be briefly described for facilitating compression/decompression of various data utilized in a wireless telecommunications network.

In at least one embodiment of the invention, a method includes receiving a registration request including a first dictionary definition. The registration request is associated with user equipment. The method includes transmitting to the user equipment a response including a second dictionary definition. The method includes transmitting subsequent messages to the user equipment if the first and second dictionary definitions agree. The subsequent messages are compressed using the first static dictionary.

In at least one embodiment of the invention, a method of decompressing a HyperText Transfer Protocol (HTTP) message portion includes storing a common message phrase in a static dictionary in memory of a virtual machine. The method includes receiving the HTTP message portion including address data in place of the common message phrase. The method includes applying a decompression algorithm to the HTTP message portion. The method includes replacing the address data in the message portion with the common phrase retrieved from the memory.

In at least one embodiment of the invention, a system includes a network platform configured to maintain a database registry of compression applications including at least one compression and decompression algorithm, at least one static dictionary, and respective algorithm and static dictionary identifiers. The network platform comprises a data transceiver configured to receive and transmit data signals, a memory configured to store the database registry, and a controller configured to determine a compression and decompression algorithm and corresponding identifier or a static dictionary and corresponding identifier for transmission by the data transceiver from the database registry in response to a request for a particular compression application.

According to one embodiment, a universal compression network platform (CNP) is provided as a wireless network resource for compression and decompression which even any UDVM or other virtual machine may use as a resource for assuring that a given static dictionary or compression or decompression algorithm is current. In its database may be maintained the latest version of a compression and associated decompression algorithm and/or static dictionary or other compression/decompression tool for universal access in a manner similar to the manner in which regional databases and servers have been provided for number portability in the United States. Alternatively, a compression network platform (CNP) may be implemented on a wireless communications network basis, for example, by each public land mobile network (PLMN) internationally or preferably on a more global basis. In a network by network implementation, each wireless network may agree to exchange and maintain their CNP databases by mutual agreement with the latest revisions and techniques. In this network by network embodiment of a CNP, there may be a problem with roaming among networks and whether the visited network needs to decompress SIP messages or instead just forward them to a home network via GPRS roaming. On a more global basis, as was utilized in number portability, a global CNP may be accessed by all networks. All such CNPs are preferably provided with redundancy and in different regions of a country for purposes, for example, of disaster recovery. A UDVM at each end of a communication channel may have on hand the bytecode and dictionary or dictionaries that each needs by conducting a dialog between them, and, in the event of a difference, resolve their difference between them or utilize a CNP.

In accordance with another embodiment, rather than uploading/downloading bytecodes to a virtual machine, for example, associated with a mobile device or a P-CSCF, a compression application of the bytecode may be applied, for example, to compress the bytecode for uploading/downloading rather than the current method of transmitting the bytecode itself to a far end virtual machine. According to one aspect of this embodiment, the compression technique may comprise a hash of the bytecode, for example, in a manner similar to that described as a static dictionary in RFC 3485 for SIP and SDP or signal compression generally as described by RFC 3320 and 3321. According to another aspect, there may be a publicly-available registry for storing the algorithm, hash or static dictionary for the bytecode, for example, as a universal resource name as would be stored in the Internet assigned numbers authority (IANA) database registry. According to the first embodiment, the algorithm, hash or static dictionary for bytecode may be stored along with its current version number and a unique identifier in a CNP described above for universal access by any virtual machine.

In accordance with yet another embodiment, there is provided a means for receiving bytecodes and retaining them for long-term utilization by a virtual machine. If a UDVM, for example, does not have a copy of a bytecode it needs for receiving a given compressed data signal transmission, the UDVM receiving the bytecode first requests the bytecode compression method from the transmitting compression virtual machine. If it cannot receive the method from the transmitter machine, according to another aspect, it may receive a unique identifier for the compression method and refer to an IANA registry or a CNP registry as suggested above according to the first and second embodiments and receive the method from them along with its identifier and version number. According to another related aspect, a new bytecode, unique identifier and its version may be propagated generally to virtual machines for long-term storage therewith and subsequently referred to by its unique identifier at a compression/decompression virtual machine, for example, by a CNP or via IANA or other registry.

In accordance with yet another embodiment, consider hypertext transfer protocol (HTTP) having a header and a message payload. An example of XML content is contact information such as an address book in XML in which each contact is delimited by the string <contact> contact data </contact>. Inside the XML contact, there may be <name> Ronald Reagan </name> and email addresses and telephone numbers, home addresses and the like for Ronald, each delimited by its own tag. In this embodiment, a static dictionary may be provided for compression of the HTTP payload or message portion. In particular, this embodiment recognizes common phrases used in the message portion such as tags from application-specific XML schema. Known compression algorithms for HTTP such as DEFLATE and GZIP may be augmented in this embodiment to provide a static dictionary for such common phrases which may be stored at the compression and decompression virtual machine and accessed as above from a CNP or via IANA or other registry. Consequently, consider the example of presence/group list management. Presence covers such concepts as online/offline status, preferred means of communication (for example, voice or text messaging). Group list management includes the aforementioned contact or "buddy" lists. For example, a user wants to maintain one or more contact lists. For example, a subscriber's contacts may be grouped into separate lists (e.g., for colleagues and friends, or according to a variety of shared interests. So there is a need to manage a contact list or preferred sub-list of contacts who one contacts more or less frequently. The virtual machine contained within the mobile device or its server will have access to and permanently store the known compression algorithm along with its added feature of accessing a static dictionary for translating the common phrases into transmittable address data (in shorter form than the common phrase data) that may be used at the decompression end to address a look-up table of the static dictionary for decompression of the common phrase.

These and other aspects and embodiments will become clear from referring to the drawings and the detailed description of the embodiments which follow.

DETAILED DESCRIPTION OF THE EMBODIMENT(S)

Figure 1:
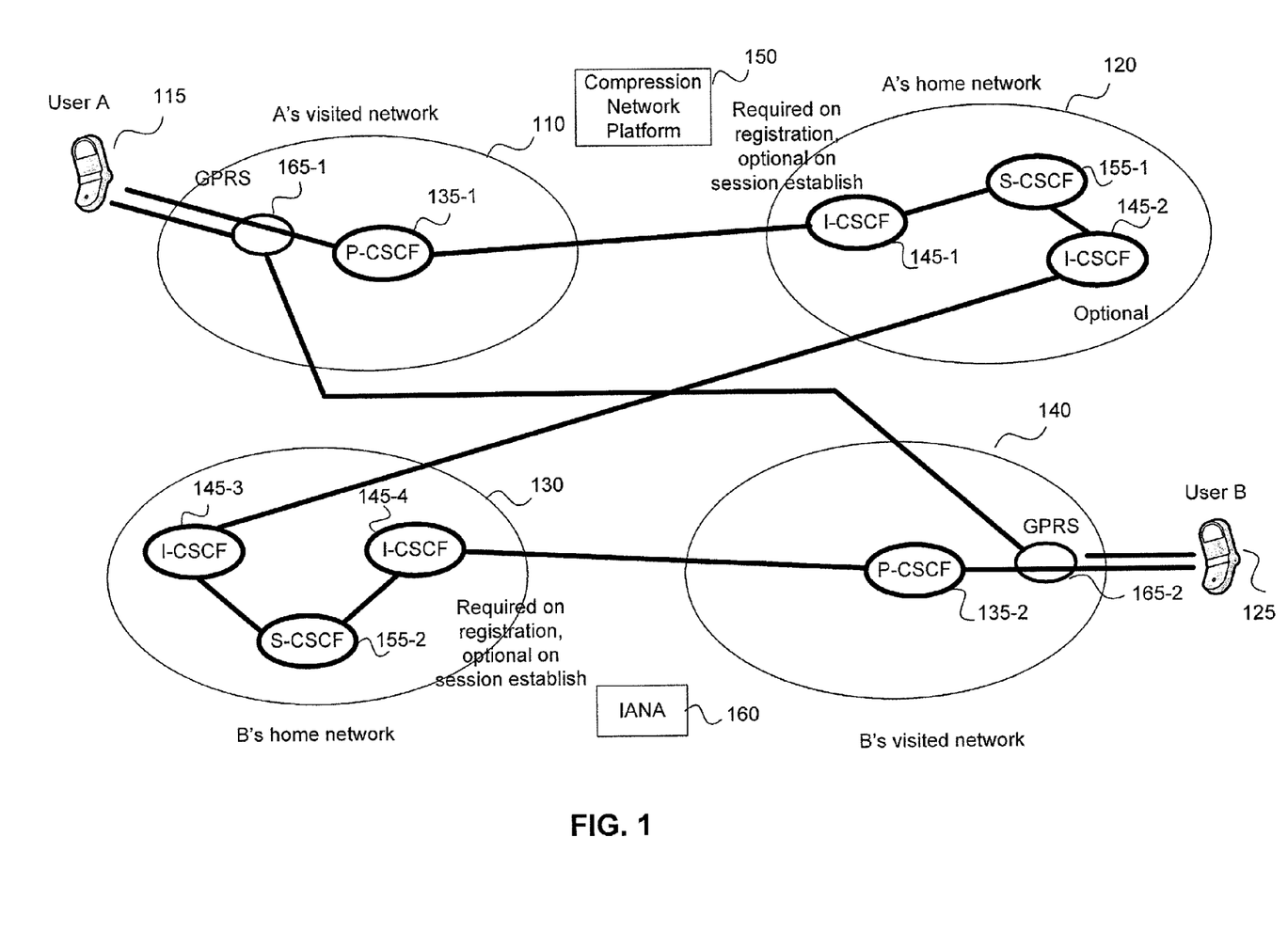
FIG. 1 shows an overview of a network connection between a first mobile device or user equipment visiting a visited wireless network and a second mobile device or user equipment in a different visited wireless network with their home networks also shown as a scenario, for example, of sending a photograph captured by a first mobile device to the second mobile device, also showing compression network platform and IANA among other possible network resources of first and second embodiments for any virtual or other machine for compressing/decompressing data signals.

Referring first to FIG. 1, and according to one embodiment, a universal compression network platform (CNP) 150 is provided as a wireless network resource for compression and decompression which even any UDVM or other virtual machine may use as a resource for assuring that a given static dictionary or compression or decompression algorithm is current according to a version number and identified by a unique identifier. In its database may be maintained the latest version of a compression and associated decompression algorithm and/or static dictionary or other compression/decompression tool for universal access in a manner similar to the manner in which regional databases and servers have been provided for number portability in the United States. Alternatively, a compression network platform (CNP) may be implemented on a wireless communications network by network basis, for example, by each public land mobile network (PLMN) internationally. As will be further described herein, a compression network platform may be restricted to a given type of compression/decompression process and further located as close to user equipment as possible to reduce latency.

In FIG. 1, a maximum of four different wireless networks, 110, 120, 130 and 140, are shown which may be interconnected by the public switched telephone network (PSTN) (not shown to keep the figure as simple as possible). There may be a telephone, for example, User A equipment, mobile device 115, that, for example, wants to publish or subscribe to presence information or create or edit buddy lists by communicating with server(s) residing, for example, in A's home network 120. Alternatively, user equipment (UE) device 115 may wish to share content, (e.g., a photograph or live video stream, digitized music, computer software, share a buddy list, contact information or other application) with another mobile device 125 in a different visited network 140. The information or content being transmitted may contain text, or the signaling exchanges that are conducted in order to facilitate transmission may contain text or content.

User equipment or mobile device as used herein refers to any known mobile terminal which may comprise terminals limited to voice telephony, but is not to be considered so limited as user equipment may include personal computers, personal communications devices and other devices having, for example, multimedia and computational capability. Similar reference characters are used throughout the drawings to designate similar elements and the first number of a reference character designates where that element first appears. For example, user equipment 115 first appears in FIG. 1, but is used to designate similar equipment throughout FIGS. 1-5.

Preferably, the data signals, for example, text or content, to be transmitted are to be compressed for transmission through the wireless medium. Both mobile devices 115 and 125 are assumed to be visiting different wireless networks. Mobile device A 115 is visiting network 110 and mobile device B 125 is visiting network 140. Visited network 110 by mobile device 115 has proxy CSCF 135-1 and general packet radio service GPRS 165-1. Mobile 115's home network 120 has interrogating CSCF 145-1, serving CSCF 155-1 and optional interrogating CSCF 145-2. Ideally, each wireless network 110, 120, 130, 140 may agree to exchange and maintain their CPN databases by mutual agreement with the latest revisions and techniques in accordance with one embodiment. CPN 150 may be shared by all networks. But, in another embodiment, there may be a plurality of these CPN platforms and databases, and they may be redundant within each public land mobile network (PLMN). Such CPNs 150 are preferably provided with redundancy and in different regions of a country for purposes, for example, of disaster recovery. Not shown in FIG. 1 are other locations of UDVMs that may utilize the services of a CPN 150 such as a SIP server, a video-on-demand application server, a music server, a presence server and the like. Again, FIG. 1 would be greatly complicated if each such point of possible signal compression/decompression in or outside a wireless network were attempted to be drawn within the boundary of the figure.

Mobile device 115 in accordance with an aspect of the invention shares its compression algorithm, static dictionary or other compression technique by a unique identifier with a network platform or with another mobile device 125 with which it wishes to communicate. In the event the far end (i.e. network platform or mobile device 125) does not understand the unique identifier, it may request the mobile device 115 to transmit the algorithm or static dictionary used (along with its identifier) or receive the compression method and identifier from a UDVM at P-CSCF 135-2 by identifier look-up. P-CSCF 135-1 may also be a check point to be sure there is consistency among points of compression and/or decompression. Also, in accordance with an aspect of the invention, when all else fails, a CNP 150 may be referred to by a virtual machine of mobile device 115 and within mobile device 125 for an appropriate compression/decompression tool that is application dependent. P-CSCF 135-1, 135-2 or CNP 150 may transmit identifiers or algorithms and identifiers to mobile devices 115, 125 for storage therein depending on the needs.

In accordance with another embodiment which also may be described with reference to FIG. 1, rather than uploading/downloading bytecodes to a virtual machine, for example, a UDVM associated with a mobile device or a P-CSCF 135-1, 135-2, a compression application of the bytecode may be applied, for example, to compress the bytecode for uploading/downloading rather than the current method of transmitting the bytecode itself to a far end virtual machine. According to one aspect of this embodiment, the compression technique may comprise a hash of the bytecode, for example, in a manner similar to that described as a static dictionary in RFC 3485 for SIP and SDP or signal compression generally as described by RFC 3320 and 3321.

According to another aspect which may be described with reference to FIG. 1, there may be a publicly-available registry for storing the algorithm, hash or static dictionary for the bytecode, for example, as a universal resource name as would be stored in the Internet assigned numbers authority (IANA) database registry 160. According to the first embodiment, the algorithm, hash or static dictionary for bytecode may be stored along with its current version number and unique identifier in a CNP 150 described above for universal access by any virtual machine.

In accordance with yet another embodiment, consider hypertext transfer protocol (HTTP) having a header and a message payload. In this embodiment, a static dictionary may be provided for compression of the HTTP payload or message portion. In particular, this embodiment of a compression method recognizes common phrases used in the message portion such as tags from application-specific XML schema. Tags may be used, for example, to delimit name, email address, telephone number, facsimile number and so on. In order to provide a positive user experience, it may be expedient to allow each subscriber to have a large number of contacts and to organize their contacts into multiple buddy lists. The tags that delimit the data can easily become voluminous. Consequently, an application of this embodiment is presence/group list management in a wireless network. As defined above, presence comprises online/offline status, preferred means of communicating (such as text message or voice) and other data about the user of a mobile device such as location of the mobile device. Known compression algorithms for HTTP such as DEFLATE and GZIP may be augmented in this embodiment to provide a static dictionary for such common phrases which may be stored at the compression and decompression virtual machine and accessed as above from a CNP or via IANA or other registry. In particular, address data for a look-up table of the static dictionary may be transmitted in place of the common phrase. On decompression at the receiving end, the address data indexes the look-up table of the static dictionary and retrieves the common phrase. Consequently, the user of a mobile device may enter a contact list or update a contact list for, for example, short message services, and the virtual machine contained within the mobile device or its server will have access to and permanently store a known compression algorithm for delimiting tags and other data along with its added feature of accessing a static dictionary for translating other common phrases into transmittable address data for indexing a look-up table that may be used at the decompression end for decompression.

Figure 2:
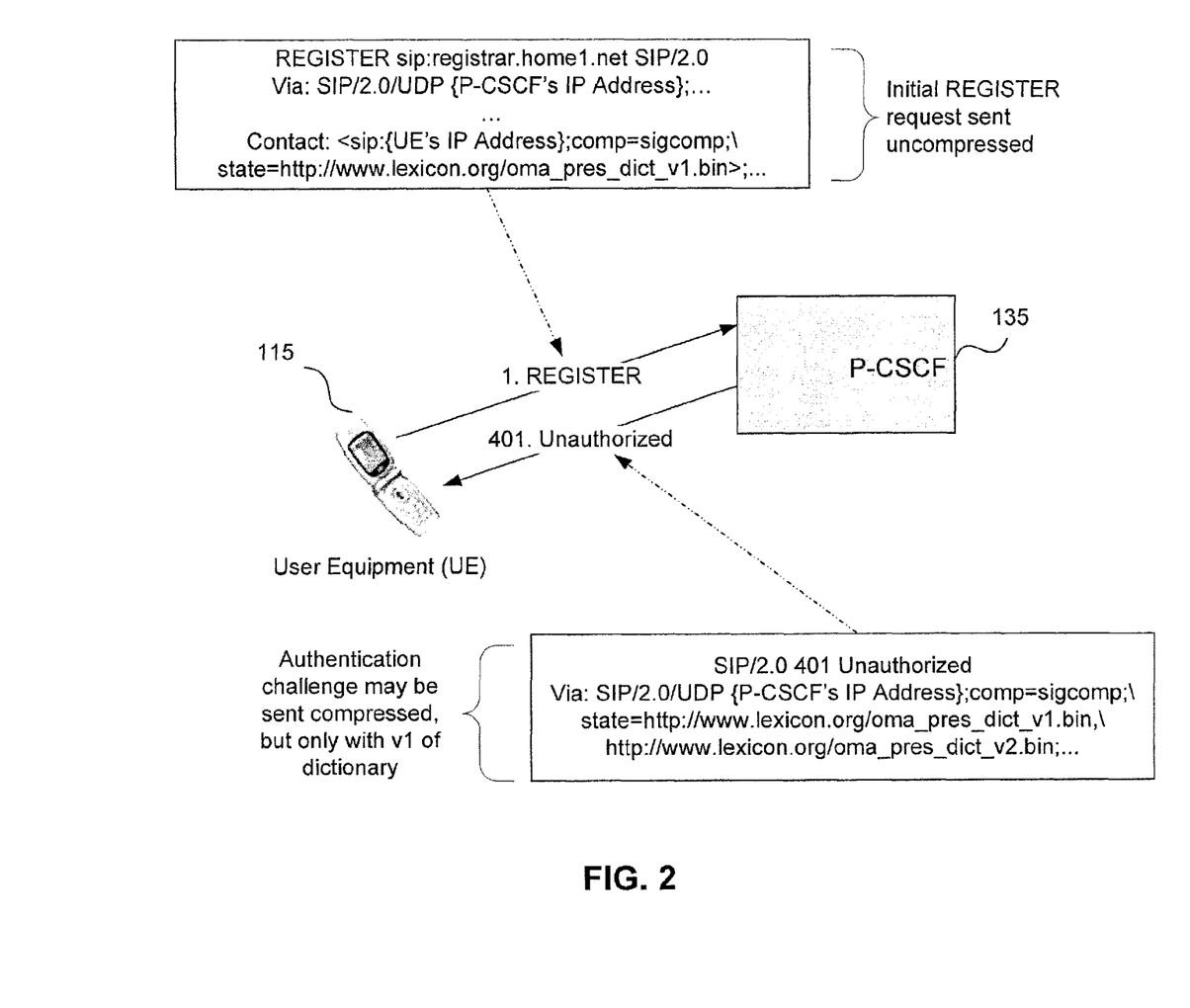
FIG. 2 is a schematic representation of a message transfer for registration between user equipment UE and a P-CSCF of FIG. 1 as one example for message compression.
Figure 3:
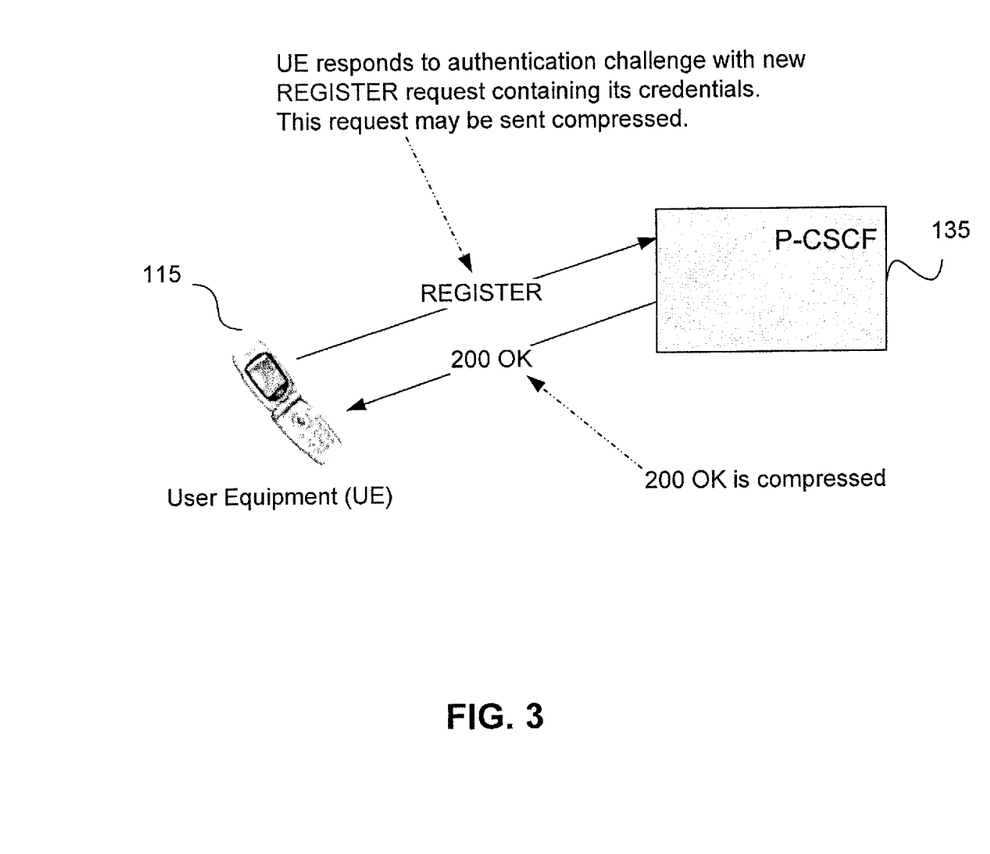
FIG. 3 is a second schematic representation of a message transfer for registration between user equipment UE and a P-CSCF of FIG. 1 as a second example for message compression.

Taken together, FIGS. 2 and 3 are schematic representations of a message transfer for registration between user equipment UE and a P-CSCF of FIG. 1 as an example for message compression. Referring first to FIG. 2, there is shown an example of an application of message compression during registration of a cellular phone or, more generalized, user equipment. In this embodiment, the user equipment 115 and P-CSCF 135 exchange information about the compression/decompression dictionaries they each may use for compression/decompression during a registration process. A first step may be the user equipment 115 sending a REGISTER request to the P-CSCF 135 providing its authentication credentials. According to one embodiment of the present invention, the REGISTER request includes a "state" parameter for defining a version of an Open Mobile Alliance (OMA) presence dictionary. Such a dictionary for OMA presence is under consideration by the Alliance but has not yet been published. Nevertheless, a value for such a dictionary is depicted as a suggested value for such a dictionary including a version number v1. The signal flow of FIG. 2 assumes that the initial REGISTER request is sent uncompressed, giving the P-CSCF 135 an opportunity to ascertain which dictionaries the P-CSCF supports. The REGISTER request may be compressed using version 1 of the OMA presence dictionary in an alternative embodiment. For example, before registering with an IMS core, user equipment must locate a P-CSCF. In third generation 3GPP networks, one of the P-CSCF discovery procedures utilizes Protocol Configuration Options which may incorporate "comp" and "state" parameters. Doing so, would enable the user equipment to compress an initial REGISTER request.

The P-CSCF 135 forwards the REGISTER request within an IMS core, not shown, which may issue an authentication challenge. As shown, a P-CSCF 135 then forwards the authentication challenge to the user equipment 115 as the 401 Unauthorized message in FIG. 2. The P-CSCF 135 inserts the comp and state headers (parameters) and their values as shown. In accordance with one embodiment, the "state=" is followed by the definition of an OMA presence dictionary, which may be a static dictionary. The "state=" from user equipment 115 alerts P-CSCF 135 of the dictionary in which "comp=sigcomp," among other message components, may be found. IETF 3486 teaches obtaining a "comp" uniform resource identifier string from the outbound proxy before the user equipment establishes a session. The depicted signal flow accomplishes that objective during registration. In the reply message from P-CSCF 135, a similar "state=" is followed by a dictionary definition as will be further explained below. In SIP headers, a string "comp=sigcomp" is frequently used, for example, as a Uniform Resource Identifier parameter in an initial REGISTER request and in a Via header field in the authentication challenge of FIG. 2. This "comp" string, by way of example, may be replaced by a compressed string of characters representing the string in an alternative or subsequent message. In a message 1.REGISTER from the user equipment 115 to the P-CSCF 135, as well as in the message 401.Unauthorized, the same comp string is found. Consequently, static dictionaries at either user equipment or a P-CSCF may be provided to reconstruct a compressed string into the transmitted string "comp=sigcomp." In FIG. 2, in the authentication challenge message, there are shown two "state=" strings indicating that the PCSCF supports both versions 1 and 2 of, for example, an OMA presence dictionary.

After a handset (user equipment) successfully attaches to a wireless network (not shown to keep FIG. 2 simplified), the handset of UE 115 attempts to register with the IMS by sending a SIP register message 1.REGISTER, for example, in accordance with IETF RFC 3486. In reply, there may be the depicted 401.UNAUTHORIZED authentication challenge message. This 401 message is an authentication challenge—that is, a request to the handset of UE 115 to provide its authentication credentials. Thereafter, another 1.REGISTER request containing authorization credentials would follow that may contain compressed data of a static dictionary alternatively to a given string such as "comp=sigcomp." That is, a first message may be sent uncompressed as shown in FIG. 2, but subsequent messages would follow with compressed data replacing the compressed string in accordance with a mutually agreed to static dictionary and version defined, for example, by "state=". Clearly, once a static dictionary is defined at each end of the transmission path, thereafter, the defined static dictionary may be used for all such follow-up messages.

In the 401.Unauthorized challenge message, the receiver, the P-CSCF 135, tells the user equipment UE 115 what dictionaries it has on hand in its "state=" parameter definition. In FIG. 2, the parameter is shown in a "Via:" header portion of the forward message to P-CSCF 135 and the return 401.Unauthorized message to signal the user equipment 115. The "state=" parameter definition considers that the version of the dictionary is v1 at the user equipment 115 and, further, that a v2 may be identified in the 401.Unauthorized reply as available at the P-CSCF 135. Unless the user equipment 115 verifies that it possesses version 2, the P-CSCF 135 may be limited to version 1 in its communication with the user equipment 115. As discussed above, a compression network platform 150 or alternative source (per FIG. 1) may be resorted to for obtaining a version 2 of a defined static dictionary via an alternative communication path not shown in FIG. 2. Obtaining compression/decompression algorithms and dictionaries will be further described with reference to FIGS. 4 and 5.

FIG. 3 is a second schematic representation of a message transfer for registration between user equipment UE 115 and a P-CSCF 135 of FIG. 1 as a second example for message compression. In FIG. 3, the user equipment 115 provides its authentication credentials in a new REGISTER request in response to the authentication challenge. This request can be compressed based on a version 1 of an OMA presence dictionary. The P-CSCF 135 replies on the assumption that "comp=sigcomp" has already been initialized. Moreover, 200 OK in reply saying to the user equipment 115 that it is authenticated may be compressed as well. Later messages between network elements shown or suggested are compressed in both directions, for example, when user equipment 115 may send an INVITE message to initiate a session (not shown).

In FIGS. 2 and 3, it is assumed that all messages are SIP messages according to present standards. Alternative embodiments of SIP and alternative forms of session protocols are contemplated within the scope of the invention. Moreover, while the depicted environment is IMS, the embodiment may be implemented within a non-IMS environment. A backslash character in a text box of either figure should be interpreted as a line continuation character.

In principle, user equipment 115 in FIGS. 2 and 3 may obtain version 2 of an OMA presence dictionary from an alternative location such as a compression network platform or P-CSCF of FIG. 1 and then compress a second REGISTER request according to the updated version. At present, updating the user equipment dictionary version in user equipment 115 may not be as practical as may be possible in the future due to the latency involved in awaiting the transmission of a version 2 or, perhaps preferably, version one/version two changes from an alternate site to the user equipment. The embodiment of FIGS. 1 and 2 is applicable regardless of whether dynamic (as opposed to static) compression is also used or regardless of whether SIP runs via Transport Layer Security (TLS) or not. If TLS is utilized, sip URIs may be replaced with sips URIs in the figures (where "sips" stands for "secure SIP").

Figure 4:
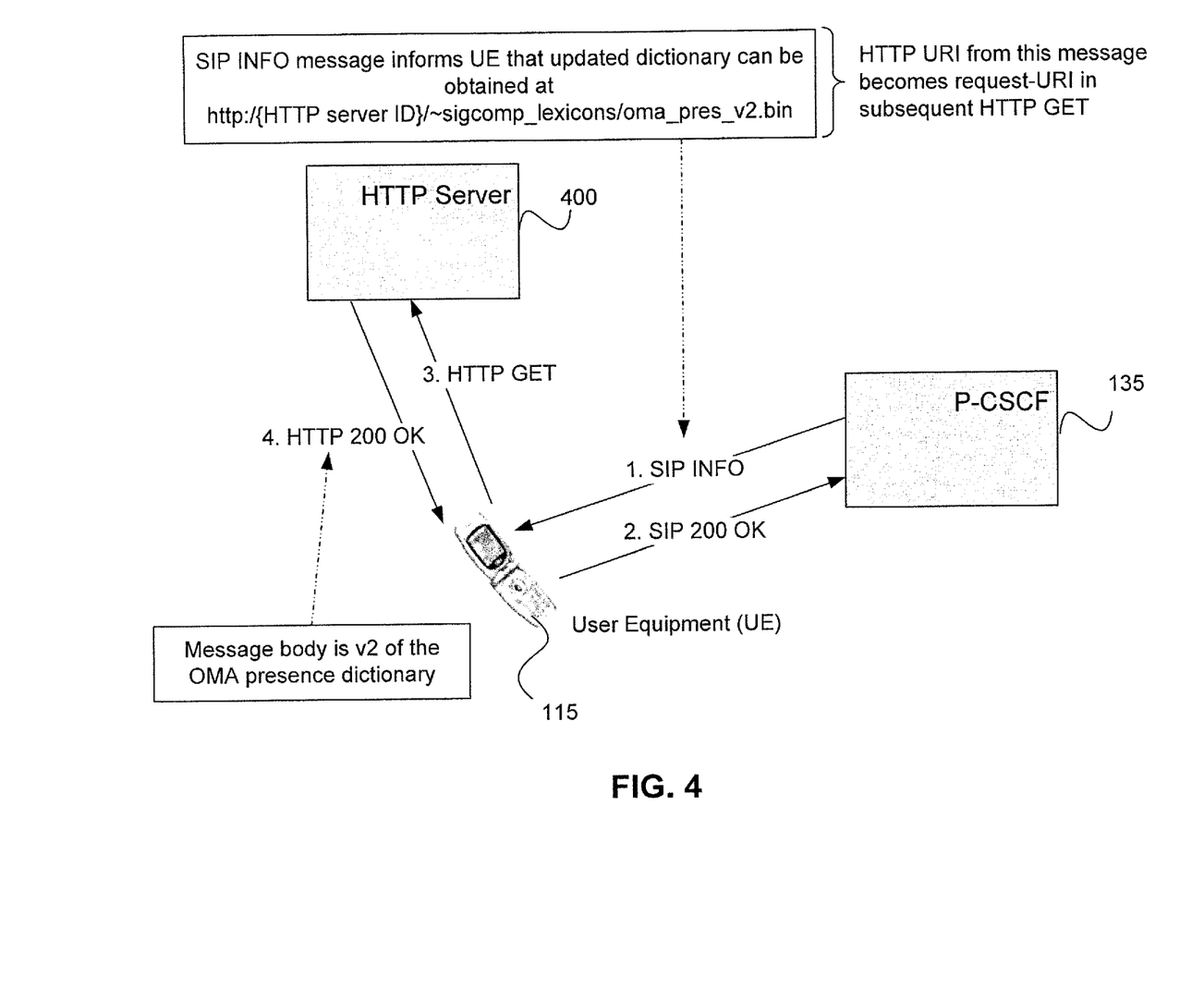
FIG. 4 is a schematic representation of a first message transfer among an HTTP server, user equipment UE and a P-CSCF of FIG. 1 by which the user equipment may obtain an updated dictionary from an HTTP server or other compression network platform of FIG. 1.
Figure 5:
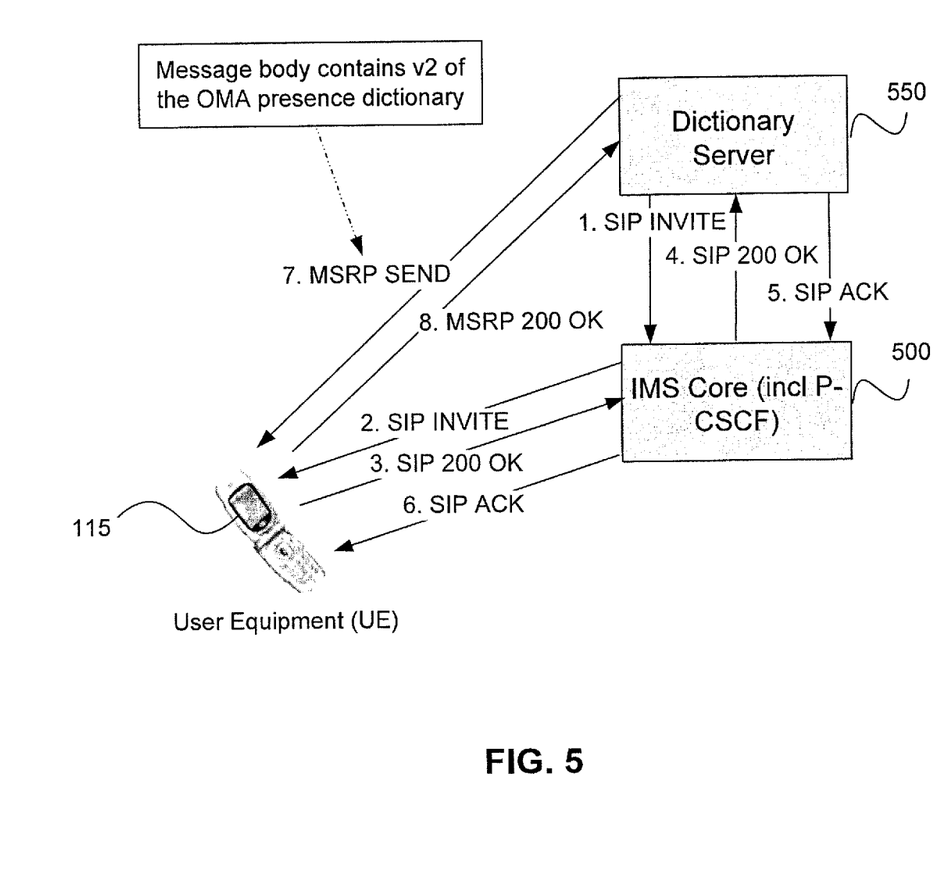
FIG. 5 is a schematic representation of a second message transfer among a dictionary server, user equipment UE and an IMS Core (including a P-CSCF of FIG. 1) by which the user equipment may obtain an updated dictionary from a dictionary server or other compression network platform of FIG. 1

FIG. 4 is a schematic representation of a first message transfer among an HTTP server 400, user equipment UE 115 and a P-CSCF 135 of FIG. 1 by which the user equipment 115 may obtain an updated dictionary from an HTTP server 400 or other compression network platform of FIG. 1. In FIG. 4, whenever a P-CSCF 135 needs to obtain an updated dictionary, the signal flow may be coordinated by an automated administrative process (not shown). Dictionary updates on user equipment 115 may be handled differently than P-CSCF updates—an administrative process need not be required. User equipment 115 is so numerous in comparison to a network platform such as a P-CSCF 135 that there may be only a limited means of knowing ahead of time when a given user equipment will be powered up and make a REGISTER request. FIG. 4 and FIG. 5 show two dynamic methods by which a given user equipment 115 may obtain an updated dictionary.

In FIG. 4, the messages between depicted elements are numbered to indicate a sequence of message signals. Besides numbering, the message signals are labeled to indicate which are SIP messages and which are HTTP messages. In signal 1, the P-CSCF 135 may send a SIP INFO message to the user equipment 115 indicating a preferred HTTP server 400 for updating an updated dictionary. As alluded to above and to reduce latency, the HTTP server 400 may be selected to be not busy and as close as possible to the user equipment 115. As highlighted in the text box, the SIP INFO message informs the UE 115 that an updated dictionary can be obtained, by way of example, at http:/[HTTP server ID]/sigcomp_lexicons/oma_pres_v2.bin. The HTTP server ID in the URI may be an IP address or domain name that user equipment 115 has resolved to an IP address or using any known method of identifying an HTTP server. The HTTP server 400 to which the URI refers may or may not be in the same service provider's network as the P-CSCF 135. Even though a universal name may be allocated to a dictionary version, a given service provider may prefer that the dictionary be downloaded from a platform in its own network and so the URI appearing in FIG. 4 is depicted to be a different identification than that provided in FIG. 2. In addition, the service provider may control latency better if located within its network than in the public internet. The HTTP URI from this message becomes a request URI in a subsequent HTTP GET message step 3 discussed below. Next, P-CSCF 135 transmits a SIP 200 OK message to the user equipment which results in the HTTP GET request of the HTTP server 400, step/signal/message 3. The identified HTTP server 400 responds in sequence with message 4.HTTP 200 OK whereby the message body of a second version of the OMA presence dictionary is transmitted to the user equipment 115 or at least the changes between version 1 and version 2.

FIG. 5 is a schematic representation of a second message transfer among a dictionary server 550, user equipment UE 115 and an IMS Core 500 (including a P-CSCF of FIG. 1) by which the user equipment 115 may obtain an updated dictionary from a dictionary server 550 or other compression network platform of FIG. 1. Eight message signals are shown for accessing a dictionary server 550 in FIG. 5. As opposed to FIG. 4 where a P-CSCF 135 sent a message to user equipment 115 telling it where to find an updated dictionary, in FIG. 5, an application server may push the dictionary to the user equipment 115 from the dictionary server 550. The dictionary server 550 initiates an MSRP (Message Session Relay Protocol) session with the user equipment 115 via the IMS core 500. Messages 1-6 constitute a known or standard session set-up comprising an INVITE via the IMS Core 500 to the user equipment 115, a 200 OK return and a SIP ACK (acknowledgement). Once the session is set-up, the dictionary server 550 exchanges, for example, the dictionary version two (or the changes between versions) for an MSRP 200 OK message. As before, if the user equipment 115 already has a version 1, then, only the changes between version 1 and version 2 need be transmitted. The purpose of the MSRP session having been accomplished, the session may be torn down in known manner via a SIP BYE/200 OK exchange between the dictionary server 550 and the user equipment 115.

Note that according to both FIGS. 4 and 5, the supporting network is the instigator for the user equipment obtaining a new version of a dictionary. For example, if the serving network is IMS, an IMS service provider may want to control the timing of the dictionary download, for example, to reduce latency, for example, avoid a busy hour, avoid performing a download in a roaming scenario and so on. The depicted dictionary server could be alerted by the network in a number of ways. For example, the P-CSCF 135 may alert the server; the IMS core could be configured to forward copies of registration request transactions to a dictionary server for review.

Continuing the discussion of FIGS. 4 and 5 with reference to FIG. 2, the user equipment 115 now has obtained an updated user dictionary (which may be a static dictionary or a dynamic compression/decompression algorithm). Consequently, the user equipment 115 will indicate the change in status the next time it dispatches a REGISTER or other request to the IMS core. At that time, SigComp would be initialized according to the updated version.

Thus, there has been shown and described several approaches for the optimized application of static dictionaries which may be utilized in concert with dynamic compression/decompression algorithms in a wireless network to considerable advantage for different purposes such as in so-called presence applications. The following set of claims should not be deemed to be limited to the embodiments described above. Alternative embodiments may come to mind to one of ordinary skill in the art for application in alternative or later generation wireless networks.

What is claimed is:

1. A method comprising:
receiving, by a first server, an uncompressed session initiation protocol registration request including an indicator of a first version of a static dictionary, the uncompressed session initiation protocol registration request being sent by user equipment;
transmitting to the user equipment a session initiation protocol response including an authentication challenge and an indication that the first version and a second version of the static dictionary are available;
receiving, by the first server, a compressed session initiation protocol registration request in response to the authentication challenge, the compressed session initiation protocol registration request including authentication credentials and being compressed according to the first version of the static dictionary; and
transmitting subsequent messages to the user equipment compressed using the first version of the dictionary; and
transmitting, by the first server to the user equipment, a session initiation protocol message that informs the user equipment of an address of a second server configured to provide the second static dictionary to the user equipment,
wherein the first server is included in a first network associated with a first service provider and the second server is included in a second network associated with a second service provider, the second service provider being different from the first service provider.

2. The method of claim 1, further comprising: initiating by the first server a Message Session Relay Protocol session including the transmission to the user equipment via a third server included in the first network.

3. The method of claim 1, further comprising:
sending a message to the user equipment by a third server included in the first network,
the message including identification information for the second server.

4. The method as recited in claim 1, wherein the static dictionary is an Open Mobile Alliance presence dictionary.

5. The method as recited in claim 1, wherein the response is transmitted to the user equipment by a proxy-call session control function.

6. The method as recited in claim 1, wherein a proxy call session control function forwards the compressed session initiation protocol registration request to an internet protocol multimedia subsystem core.

7. The method as recited in claim 1, wherein the subsequent messages include a message indicating that the user equipment is authenticated.

* * * * *